May 30, 1967 E. D. HASENWINKLE ET AL 3,322,586
METHOD AND APPARATUS FOR JOINING LAMINAE AT THE POINT
OF CONVERGENCE OF THEIR RESPECTIVE CONVEYORS
Filed June 11, 1963 3 Sheets-Sheet 1

INVENTORS.
EARL D. HASENWINKLE
HENRY M. PREUSSER
BY
Leslie G. Noller ATT'Y
Henry W. Haigh AG'T

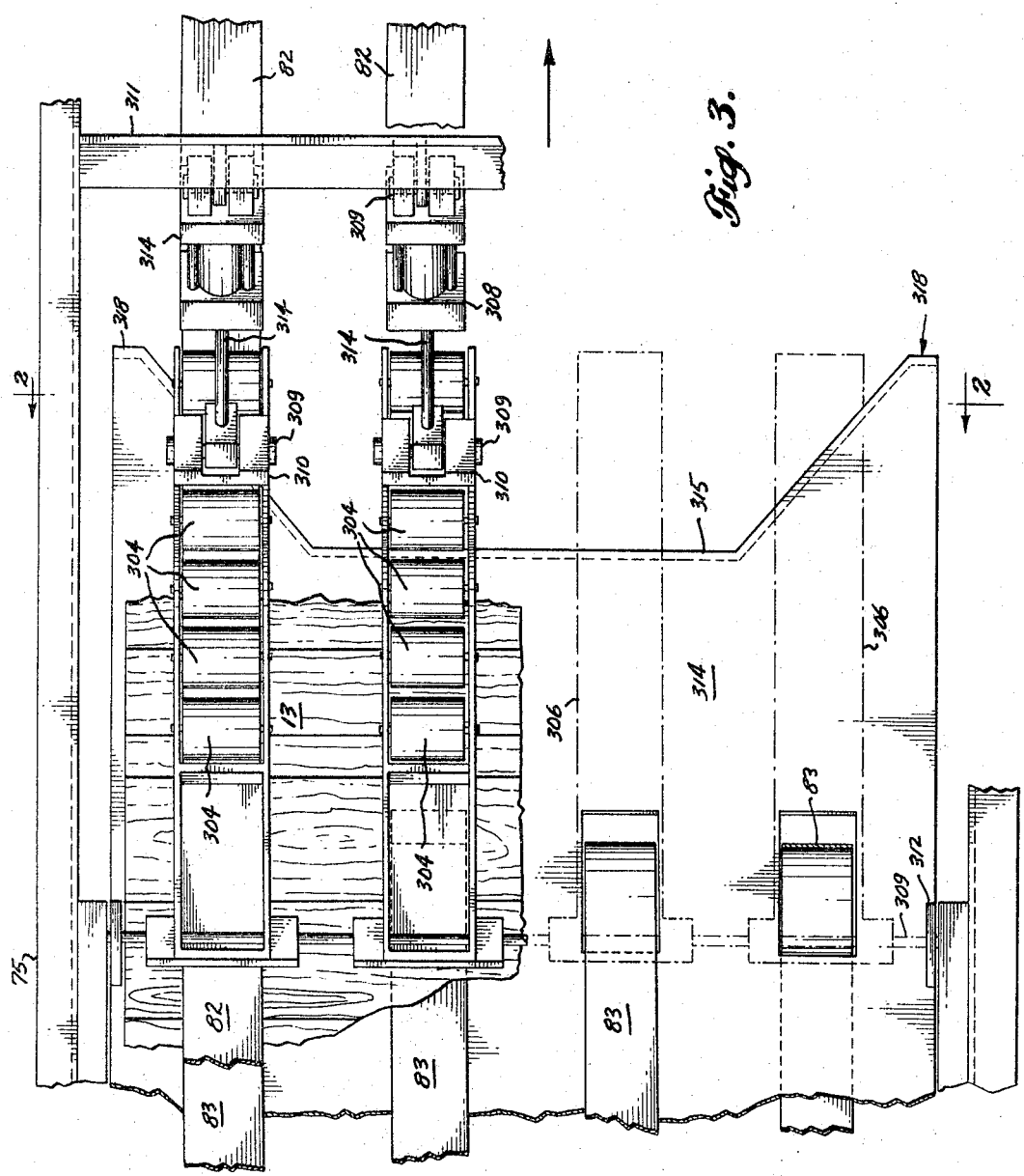

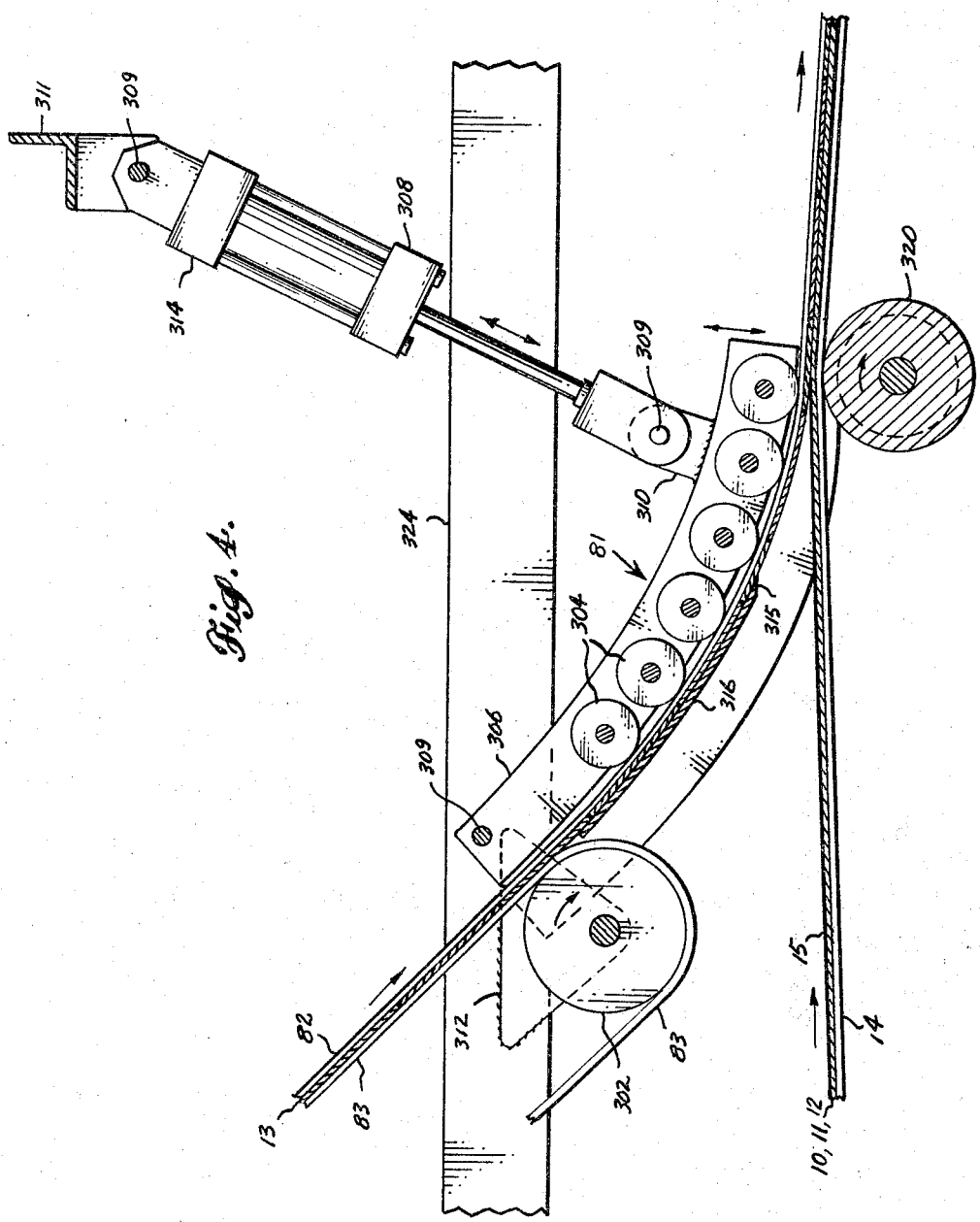

United States Patent Office 3,322,586
Patented May 30, 1967

3,322,586
METHOD AND APPARATUS FOR JOINING LAMINAE AT THE POINT OF CONVERGENCE OF THEIR RESPECTIVE CONVEYORS
Earl D. Hasenwinkle and Henry M. Preusser, Seattle, Wash., assignors to Weyerhaeuser Company, Tacoma, Wash., a corporation of Washington
Filed June 11, 1963, Ser. No. 286,981
13 Claims. (Cl. 156—201)

This invention relates to manufacturing laminated materials wherein laminae are held together by adhesives. More particularly, the invention relates to joining laminations as respective lamina conveyor flow lines converge following application of adhesives to one or both laminae of a pair of soon to be contacted, the adhesives being applied directly or indirectly.

The purpose of the invention is to provide both a method and apparatus to overlay laminae in an aligned, non-overlapping, non-void spacing, uniform adhesive spread and continuing product flow manner.

This invention is particularly important in conjunction with "Apparatus and Method for Manufacturing Laminar Materials Joined Together With Wet Adhesive Webs," as disclosed in United States patent application, Ser. No. 219,410, now Patent No. 3,247,042.

When laminar materials are manufactured using apparatus which operates essentially continuously practicing a method of uniformly manufacturing modules which are composed of two or more laminae joined together by adhesives, a critical operating locale along the production line centers around the convergence conveyor paths which necessitates termination of one conveyor. Continuous flow of laminae from respective conveyors must be maintained by moving ahead joined laminae on one continuing conveyor. Moreover, during such joining and advancing travel of laminae, the adhesive distribution between joined laminae must remain substantially evenly distributed.

An embodiment of apparatus which can be used for this method of joining laminae wherein laminae are converged while in motion without substantially disturbing adhesive spread distribution or the entire lamina flow production is illustrated in drawings, wherein:

FIGURE 3 is a top view, with some components broken away in whole or in part, of the production line where jointure of laminae is undertaken; and FIGURE 4 is an enlarged fragmentary sectional elevation of FIGURE 1 concerned primarily with apparatus in the central conveyor portion where jointure of laminae is commenced.

Figure 1:
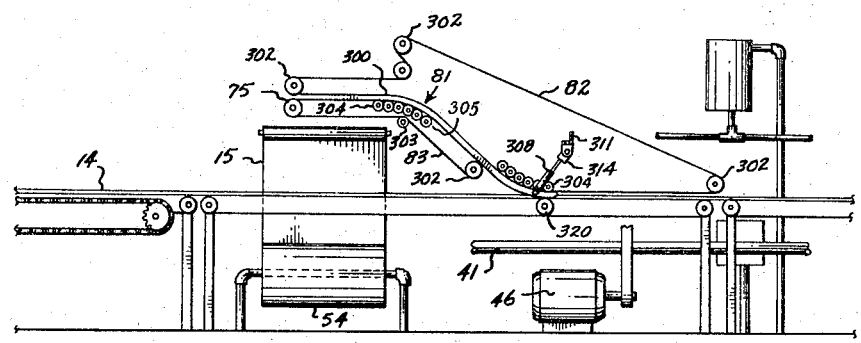
FIGURE 1 is an enlarged fragmentary elevation of FIGURE 1 of application, Ser. No. 219,410, showing locations of improved and added apparatus of this invention.
Figure 2:
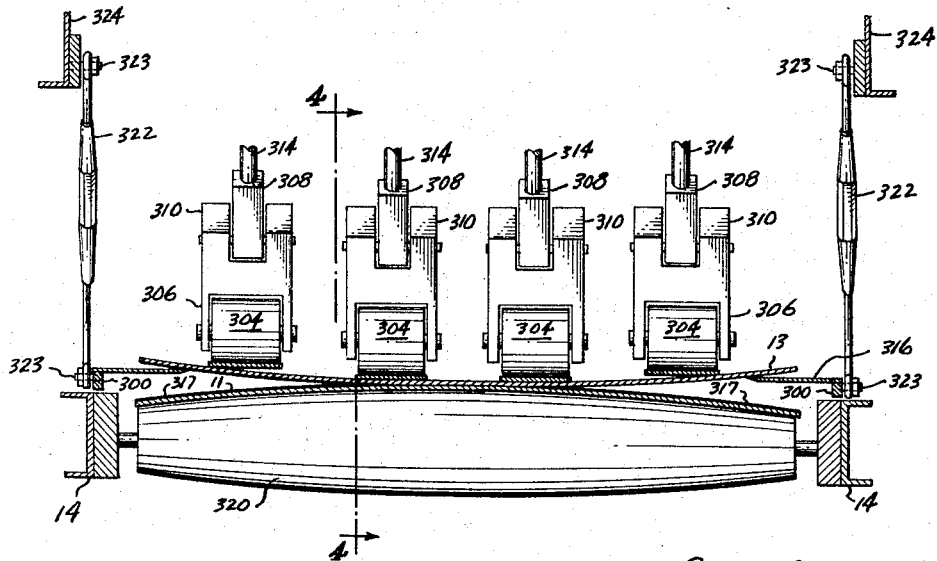
FIGURE 2 is a cross-sectional view taken across the production line where jointure of laminae is commencing.

As illustrated in FIGURES 1 and 2, and also described in application, Ser. No. 219,410, and further indicated in FIGURE 1 of this application, traveling modules are assembled enroute as their individual components are respectively, substantially and continuously fed to and through overall apparatus. The apparatus, arranged in these figures, during operation produces near termination of the production line, a module which is composed of substantially full size laminae such as a center 10, back 11 or face 12, covered with a wet adhesive web 15, in turn overlaid by multiple sections of laminae 13, core cross bands, arranged as an equivalent planar lamina and finally topped by a second wet adhesive web (not shown).

This invention pertains to the method and apparatus of causing jointure of sections of laminae 13 optionally to a center 10, back 11 or face 12 lamina utilizing an intervening adhesive coating, optionally provided as illustrated by wet adhesive web 15. During the continuing operation of the conveying means 14, its power shaft 41 and motor 46, laminae are moved by the roll 54 source of web materials which are coated with adhesives becoming wet webs such as 15. On this moving first laminar subassembly, the next laminar layer is controllably and cautiously applied. Preferably and generally this next layer is arranged with structural grain patterns at substantially ninety degrees with the first lamina. Also being a resulting interior lamina, sectionalized lamina construction is possible. As a result, handling of smaller transversely oriented laminae sections is optionally and preferably involved.

Therefore, this method comprises the positive delivery of substantially abutting lamina sections, held frictionally and compressably in an arc-like position enroute to the place of jointure; joining lamina sections one at a time to converging laminae by progressively increasing contact from first central contacting surfaces and thereafter to outer contacting surfaces as lamina curvature producing forces are applied, and transferring continuous overall conveyor motion to all laminae upon commencement of adhesion between central contacting lamina surfaces.

Practice of this method, referred to as core-cross band let down in plywood manufacture, assures continuous product flow, manufacturing a module substantially uniform in strength and density, composed of at least two structural laminations to be combined with other laminae and modules into final laminated products such as three or more ply laminated panels. Continuity of the adhesive layer or spread is preserved as disturbing relative motions or other adhesive scrapping movements are avoided. Continuity of the sectional lamina lamination is maintained as the compressibly held transversely curved sections of laminae are delivered to the jointure locale. When so held and delivered, overlapping of laminae sections is avoided and their buckling or crumpling along their major axis is prevented. Also, the abutting follow-on flow of laminae sections is maintained at sufficient speed to avoid spacing between these laminae sections that would otherwise reduce the overall strength of resulting modules and products.

In FIGURES 1 through 4, an embodiment of apparatus is illustrated arranged for performance of this method. In FIGURE 1, the juncture of conveying means 14 and 75 is shown. Laminae sections, such as cores 13, travel above substantially full size laminae below, such as backs 11 as the latter are receiving wet web 15. Then laminae sections 13 are conveyed downward using let-down apparatus 300 having its decreasing elevation section 81 with upper drive belt system 82 and lower drive belt system 83 moving core sections 13, as top and bottom moving belt frictional propulsive forces are uniformly and constantly applied.

Throughout drive belt systems or assemblies 82 and 83 major directional change rollers 302 are used and in each system at least one change roller is powered (not shown). Smaller directional change rollers 303 are also used. In other locations in these drive belt assemblies 82 and 83, adjacent rollers 304 are arranged in groups 305 at major lamina surface contour change places, for example, where the core let-down commences and terminates.

Rollers 304 are rotatably mounted in curved frame members 306 which in turn are adjustably and forcibly retained in effective conveying positions. Such forceful adjustment is optionally handled by pivotally mounted actuators 308 which are pin 309 secured to mounting brackets 310 on frames 306 and also to an overhead cross frame 311, in turn supported (not shown) to overall conveyor means 14. The remaining pivotal support of frames 306 is handled by pin 309 mounting to brackets 312 secured (not shown) to conveyor means 75.

As noted in FIGURES 2, 3 and 4, multiple assemblies 314 of actuated group rollers 304 are arranged across the production line. Preferably, four such assemblies 314, as a desired minimum, are independently adjusted to curve laminae sections 13 as rollers 304 forcibly contact each section 13 from above while it is partially restrained from below by guiding ramp 316.

This supporting-guiding-restraining ramp 316 is secured to the core let down apparatus 300 near the termination of lower belt drive system 83. Laminae sections 13 are driven directly unto ramp 316 as belt drive system 82 continues on before terminating beyond ramp 316. Adjustable speed controls for the conveyors can be regulated to operate the terminating conveyor 82 at a slightly higher speed than the speed of the continuing conveyor 14. Although driving power is no longer available from belt drive system 83, the main conveyor means 14 commences quite soon to become effective as adhesive contact is made between central surfaces of core cross bands 13 and backs 11. Complete adhesive surface contacting is completed before belt drive system 82 terminates and conveying means 14 becomes fully operational in conveying all the traveling materials to subsequent stages of fabrication.

Although curvature of laminae sections 13 alone would cause adhesive contact to be made first between central surfaces of such sections 13 and lamina 11, such prior central contacting is assured by opposite curvature of lamina 11. However, the primary purpose of such curvature of lamina 11 is to provide clearance between the adhesive coated outer lamina 11 edges 317 and the continuing spaced swallow-like tail let down extensions 318 which continue cooperating with rollers 304 completely positioning and aligning lamina sections 13 on conveyor means 14. This curvature of lamina 11 is accomplished as the lamina is passed over conveyor mounted roller 320 especially formed to raise the lamina 11 center while permitting falling of the lamina edges 317.

Precise adjustment for different lamina thicknesses or complete clearance of core let down apparatus 300 with respect to conveyor means 14 is handled by changing adjustable length supports 322 pivotally secured by fasteners 323 at one end to conveyor framing 324 and by fasteners 323 at their other end to the core let down apparatus 300.

For each production run of specific laminae, especially with respect to specific laminae sections 13, astute adjustments of supports 322 and roller groups 305 permit precise control over the important first occurring central portion adhesive contacts.

The practice of this method, notably with the illustrated apparatus, results in positive feed of laminae sections into alignment with substantially full size laminae without hindering overall production flow and without substantially rearranging adhesive distribution which is preferably predetermined by wet adhesive webs. The central portion adhesive contacts occur simultaneously, sufficiently beyond the conveyor means 14 centerline, to avoid twisting of any laminae section 13. Also, the central portion adhesive contacts occur quickly enough to avoid any last moment overlapping or underrunning of laminae sections 13. The jointure of these laminae coming from two conveyors to be joined and subsequently to be transported on only one conveyor by employing this progressive adhesive contact core let down method results in quality products composed of laminations very well bonded together.

We claim:

1. During manufacture of laminated products on a continuously operating production line, the method of joining respective laminae while both laminae are in motion coming from independent sources following coating by adhesives of at least one lamina, comprising steps of:
    (a) feeding laminae positively toward and into a jointure locale;
    (b) bending at least one lamina so that it defines a curve in the horizontal plane transverse to the direction it is moving;
    (c) causing initial contact of laminae between respective central surfaces of laminae;
    (d) phasing out feeding of one lamina and continuing feeding of the other lamina;
    (e) phasing out bending of one lamina; and
    (f) completing contact of laminae.

2. The method, as claimed in claim 1, following bending at least one lamina, including the additional step of bending the other lamina so that it defines a curve in the horizontal plane transverse to the direction it is moving, which curve is the mirror image of the curve defined by said one lamina, before causing initial contact of laminae between respective central surfaces of laminae.

3. The method, as claimed in claim 1, including the additional step of regulating feeding of laminae at slightly different speeds by feeding one lamina faster with respect to the phasing out feeding of the other lamina.

4. The method, as claimed in claim 1, in which all the steps of: feeding laminae positively toward and into a jointure locale, bending at least one lamina, and causing initial contact of the laminae between respective central surfaces of laminae, are undertaken substantially during the same time period.

5. The method, as claimed in claim 1, in which all the steps of: phasing out the feeding of one lamina and continuing feeding of the other lamina, phasing out bending of one lamina and completing contact of laminae, are undertaken substantially during the same time period.

6. In apparatus for manufacturing adhesive bonded laminar materials on a production line, which operates essentially continuously, uniformly fabricating modules which are combined with select laminae to complete end products, lamina let down apparatus, operated to place lamina on lamina while both are in motion and one lamina at least being covered with adhesive, comprising:
    (a) conveyors of laminae arranged to converge with one conveyor terminating and the other conveyor continuing; and
    (b) transverse bending equipment on the conveyors to transversely bend at least one lamina at the convergence of conveyors presenting a convex surface of one lamina to the other lamina.

7. In the lamina let down apparatus as claimed in claim 6, adjustable speed controls for the conveyors regulated to operate the terminating conveyor at a slightly higher speed than the speed of the continuing conveyor.

8. In the lamina let down apparatus as claimed in claim 6, top and bottom driving belt systems powering laminae moving on the terminating conveyor.

9. In the lamina let down apparatus as claimed in claim 8, the top driving belt system being of greater effective length to continue moving its conveyed lamina after termination of the bottom moving belt system having a shorter effective length.

10. In lamina let down apparatus as claimed in claim 6, the transverse bending equipment, comprising: multiple and adjustable contour forming actuators supported on framing of at least one conveyor and variably moved into forming contact with conveyed laminae, and force opposing lamina flow guiding ramp supported on framing of at least one conveyor and mounted to reactively support the lamina as the lamina is contacted by the variably moved forming actuators.

11. In the lamina let down apparatus, as claimed in claim 10, the underlying force opposing-lamina flow guiding ramp, comprising: a lamina contacting contour first supporting the passing lamina entirely across the conveyor production line and thereafter supporting the passing lamina only at the lamina edges traveling along the conveyor sides.

12. In the lamina let down apparatus as claimed in claim 6, adjustable means to position the converging conveyors with respect to establishing selected clearance at their near convergence locale.

13. In lamina let down apparatus as claimed in claim 6, the transverse bending equipment, comprising: a transverse roller interdisposed in the continuing conveyor having both a central larger diameter roller portion spaced apart from the otherwise substantially uniform conveyor level and end smaller diameter roller portion spaced apart from the otherwise substantially uniform conveyor level, such overall interdisposed transverse roller configuration causing conveyed lamina passing over the roller to bend transversely as adhesive contact is made between laminae without substantially altering the prior adhesive distribution.

References Cited

UNITED STATES PATENTS

| | | | |
|---|---|---|---|
| 734,423 | 11/1902 | Liepmann | 156—212 |
| 1,808,582 | 6/1931 | Taylor | 156—201 |
| 2,418,100 | 3/1947 | Stewart | 144—254 |
| 2,490,819 | 12/1949 | Lambert et al. | 156—558 |
| 2,584,693 | 2/1952 | Gerard | 156—201 |
| 2,712,343 | 7/1955 | Stanton | 156—583 |
| 2,771,109 | 11/1956 | Michaelis | 144—254 |
| 2,857,302 | 10/1958 | Burton et al. | 161—128 |
| 3,133,850 | 5/1964 | Alenius | 156—558 |

FOREIGN PATENTS 17,549    1912    Great Britain.

EARL M. BERGERT, *Primary Examiner.*
H. F. EPSTEIN, *Assistant Examiner.*